US010805503B2

(12) United States Patent
Lee

(10) Patent No.: US 10,805,503 B2
(45) Date of Patent: Oct. 13, 2020

(54) INFORMATION PROCESSING APPARATUS, METHOD, AND COMPUTER-READABLE MEDIUM FOR RECEIVING INSTRUCTION TO TRANSMIT ERROR NOTIFICATION AND TRANSMITTING ERROR NOTIFICATION TO EXTERNAL DEVICE

(71) Applicant: Brother Kogyo Kabushiki Kaisha, Nagoya-shi, Aichi-ken (JP)

(72) Inventor: Tony Lee, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/549,283

(22) Filed: Aug. 23, 2019

(65) Prior Publication Data

US 2020/0068090 A1 Feb. 27, 2020

(30) Foreign Application Priority Data

Aug. 24, 2018 (JP) .................................. 2018-156851

(51) Int. Cl.
*G06F 15/00* (2006.01)
*G06F 3/12* (2006.01)
*G06K 1/00* (2006.01)
*H04N 1/32* (2006.01)
*H04N 1/00* (2006.01)

(52) U.S. Cl.
CPC ....... *H04N 1/32635* (2013.01); *H04N 1/0001* (2013.01); *H04N 1/00037* (2013.01); *H04N 1/00039* (2013.01); *H04N 1/32662* (2013.01)

(58) Field of Classification Search
CPC ........... H04N 1/32635; H04N 1/32662; H04N 1/0001; H04N 1/00037; H04N 1/00039
USPC ........................................ 358/1.15, 1.1, 1.14
See application file for complete search history.

(56) References Cited

U.S. PATENT DOCUMENTS

2019/0238714 A1* 8/2019 Hase .................. H04N 1/00244
2020/0068082 A1* 2/2020 Haginaka ........... H04N 1/00708

FOREIGN PATENT DOCUMENTS

| JP | H06-164802 A | 6/1994 |
| JP | H06-164882 A | 6/1994 |
| JP | H11-314439 A | 11/1999 |
| JP | 2005-305887 A | 11/2005 |

* cited by examiner

*Primary Examiner* — Douglas Q Tran
(74) *Attorney, Agent, or Firm* — Banner & Witcoff, Ltd.

(57) ABSTRACT

An information processing apparatus includes a user interface, a communication interface, and a controller configured to, in response to receiving via the user interface an instruction to transmit an error notification, refer to one or more error records registered in error history data stored in a memory, each error record representing an error caused in the information processing apparatus, determine whether the one or more error records referred to include at least one error record associated with a previously selected error type, and in response to determining that the one or more error records referred to include the at least one error record associated with the previously selected error type, transmit the error notification to an external device via the communication interface.

20 Claims, 9 Drawing Sheets

FIG. 7

ERROR NOTIFICATION REPORT

PRINTER INFORMATION
MODEL NUMBER      A1-XXX
SERIAL NUMBER     Ser143245
SOFTWARE VERSION  Ver6
MEMORY SIZE       XXXMB
MONOCHROME/COLOR  COLOR
...

ERROR HISTORY (100 ERROR RECORDS)

| NO | Occurrence Time | Error Type | Error Code | User-Selected Error Type | Detailed Information |
|---|---|---|---|---|---|
| 1 | 7/23 12:40 | Memory Full | code1117 | Selected | An error of "Memory Full" has occurred during image scanning of the third page of the document sheets. The error has occurred during generation of image data NO. XXX. |
| 2 | 7/23 10:50 | Tray Out | code1115 | Not Selected | — |
| 3 | 7/23 10:00 | Sheet Shortage | code1113 | Not Selected | — |
| 4 | 7/23 9:00 | Sheet Jam | code1223 | Selected | An error of "Sheet Jam" has occurred at the pickup roller. A sheet has been detected in the position XXX. Sheet Size: A4 |
| 98 | 7/22 18:20 | Cover Open | code1114 | Not Selected | — |
| 99 | 7/22 17:00 | Cover Open | code1114 | Not Selected | — |
| 100 | 7/22 16:30 | Cartridge Replacement | code1122 | Selected | An error of "Cartridge Replacement" for black has occurred. The number of usages of the old cartridge: XXX. The usage time of the old cartridge: XXXX. |

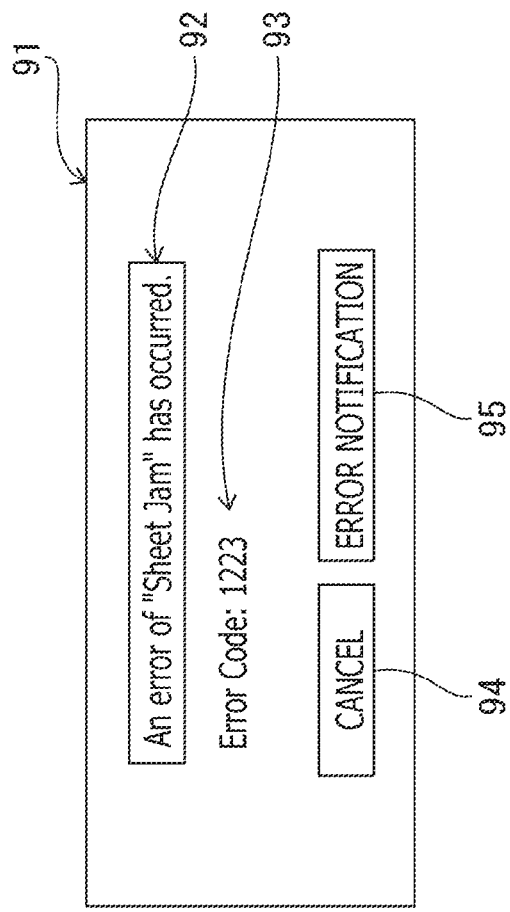

INFORMATION PROCESSING APPARATUS, METHOD, AND COMPUTER-READABLE MEDIUM FOR RECEIVING INSTRUCTION TO TRANSMIT ERROR NOTIFICATION AND TRANSMITTING ERROR NOTIFICATION TO EXTERNAL DEVICE

CROSS-REFERENCE TO RELATED APPLICATION

This application claims priority under 35 U.S.C. § 119 from Japanese Patent Application No. 2018-156851 filed on Aug. 24, 2018. The entire subject matter of the application is incorporated herein by reference.

BACKGROUND

Technical Field

Aspects of the present disclosure are related to an information processing apparatus, a method, and a non-transitory computer-readable medium for transmitting an error notification.

Related Art

Heretofore, a copy machine has been known that includes a remote notification key configured to, when operated, transmit an error notification to request a serviceman to provide maintenance in response to occurrence of an error in the copy machine. For instance, when the remote notification key is operated, the copy machine may transmit, as the error notification, data representing the number of paper jams caused in the copy machine.

Further, a fax machine has been known that includes a key input interface having a help key to be operated in response to occurrence of an error in the fax machine. When the help key is operated, the fax machine may automatically make a call to a service center with a telephone number registered in the fax machine.

SUMMARY

Each of the aforementioned known machines is configured to transmit the error notification each time the corresponding key is operated. Therefore, the known machines might transmit the error notification excessively frequently regardless of what type of error has occurred.

Aspects of the present disclosure are advantageous to provide one or more improved techniques for an information processing apparatus to make the number of transmissions of an error notification less than the number of times of receiving an instruction to transmit the error notification.

According to aspects of the present disclosure, an information processing apparatus is provided, which includes a user interface, a communication interface, and a controller. The controller is configured to, in response to receiving via the user interface an instruction to transmit an error notification, refer to one or more error records registered in error history data stored in a memory, each error record representing an error caused in the information processing apparatus, determine whether the one or more error records referred to include at least one error record associated with a previously selected error type, and in response to determining that the one or more error records referred to include the at least one error record associated with the previously selected error type, transmit the error notification to an external device via the communication interface.

According to aspects of the present disclosure, further provided is a method implementable on a processor coupled with an information processing apparatus including a user interface and a communication interface. The method includes, in response to receiving via the user interface an instruction to transmit an error notification, referring to one or more error records registered in error history data stored in a memory, each error record representing an error caused in the information processing apparatus, determining whether the one or more error records referred to include at least one error record associated with a previously selected error type, and in response to determining that the one or more error records referred to include the at least one error record associated with the previously selected error type, transmitting the error notification to an external device via the communication interface.

According to aspects of the present disclosure, further provided is a non-transitory computer-readable medium storing computer-readable instructions that are executable by a processor coupled with an information processing apparatus including a user interface and a communication interface. The instructions are configured to, when executed by the processor, cause the information processing apparatus to, in response to receiving via the user interface an instruction to transmit an error notification, refer to one or more error records registered in error history data stored in a memory, each error record representing an error caused in the information processing apparatus, determine whether the one or more error records referred to include at least one error record associated with a previously selected error type, and in response to determining that the one or more error records referred to include the at least one error record associated with the previously selected error type, transmit the error notification to an external device via the communication interface.

BRIEF DESCRIPTION OF THE ACCOMPANYING DRAWINGS

Figure 3:
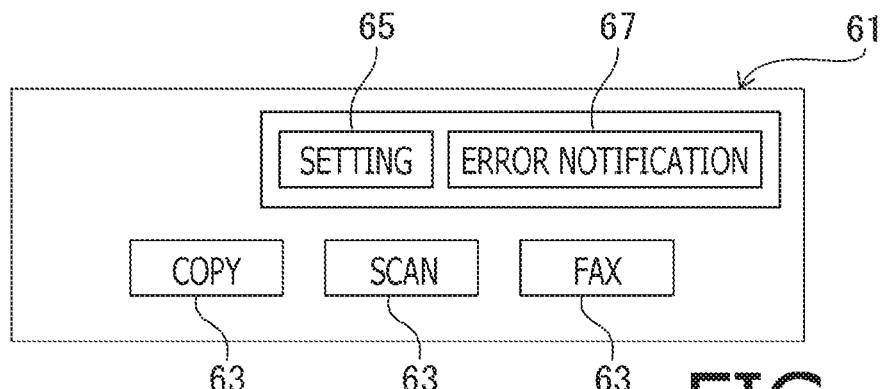

FIG. 3 exemplifies a screen displayed on a touch panel of the MFP in the first illustrative embodiment according to one or more aspects of the present disclosure.

Figure 4:
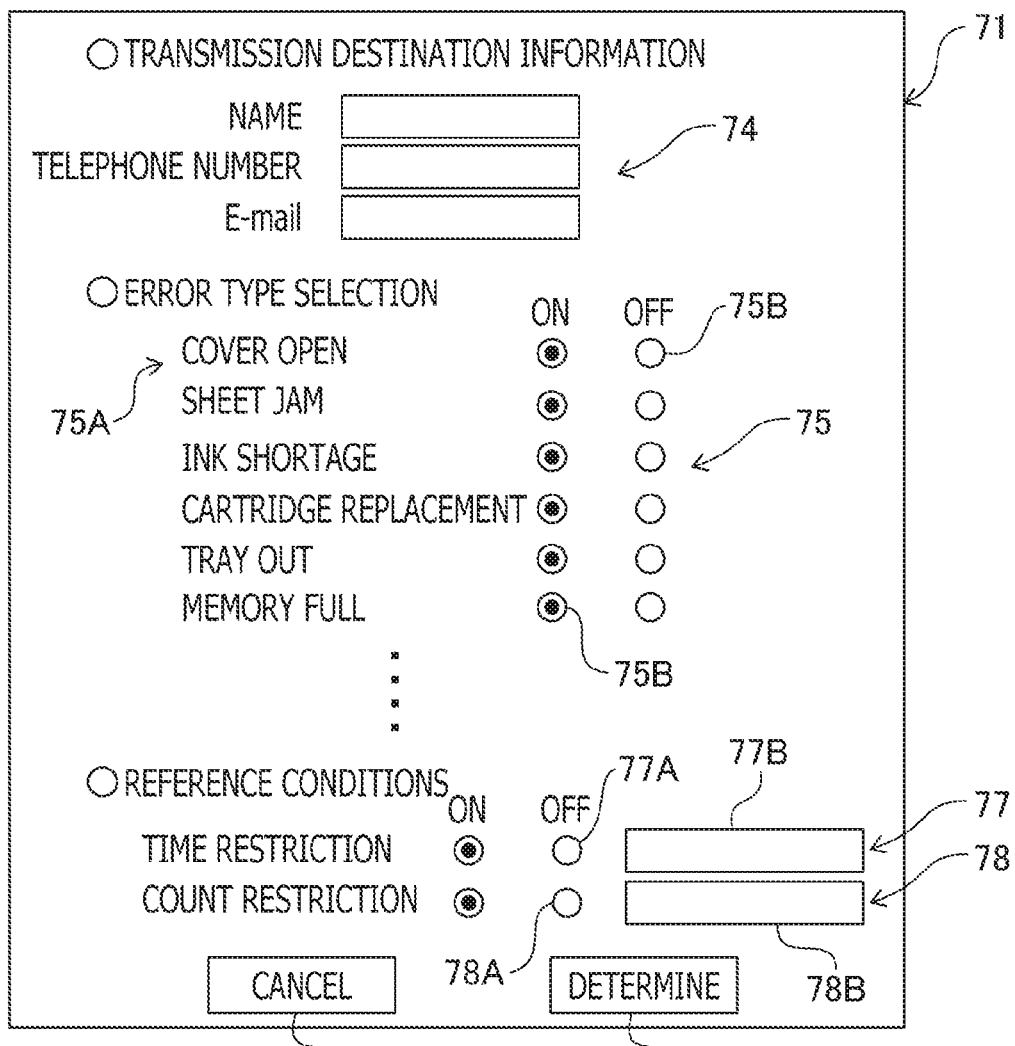

FIG. 4 exemplifies a setting screen of an EWS ("EWS" is an abbreviation of "Embedded Web Server") in the first illustrative embodiment according to one or more aspects of the present disclosure.

Figure 5:
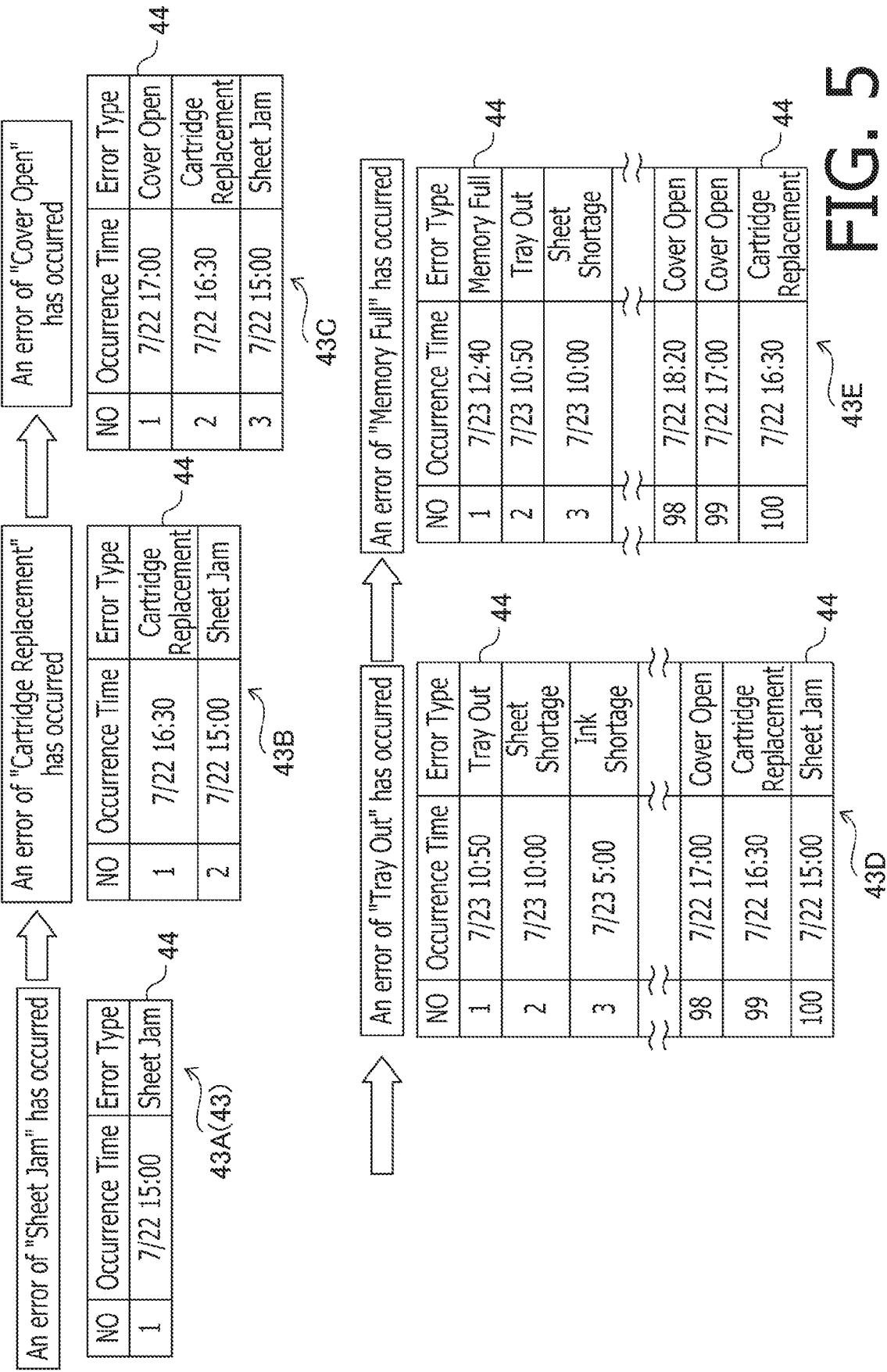

FIG. 5 shows changes of an error history DB being sequentially updated, in the first illustrative embodiment according to one or more aspects of the present disclosure.

Figure 6A:
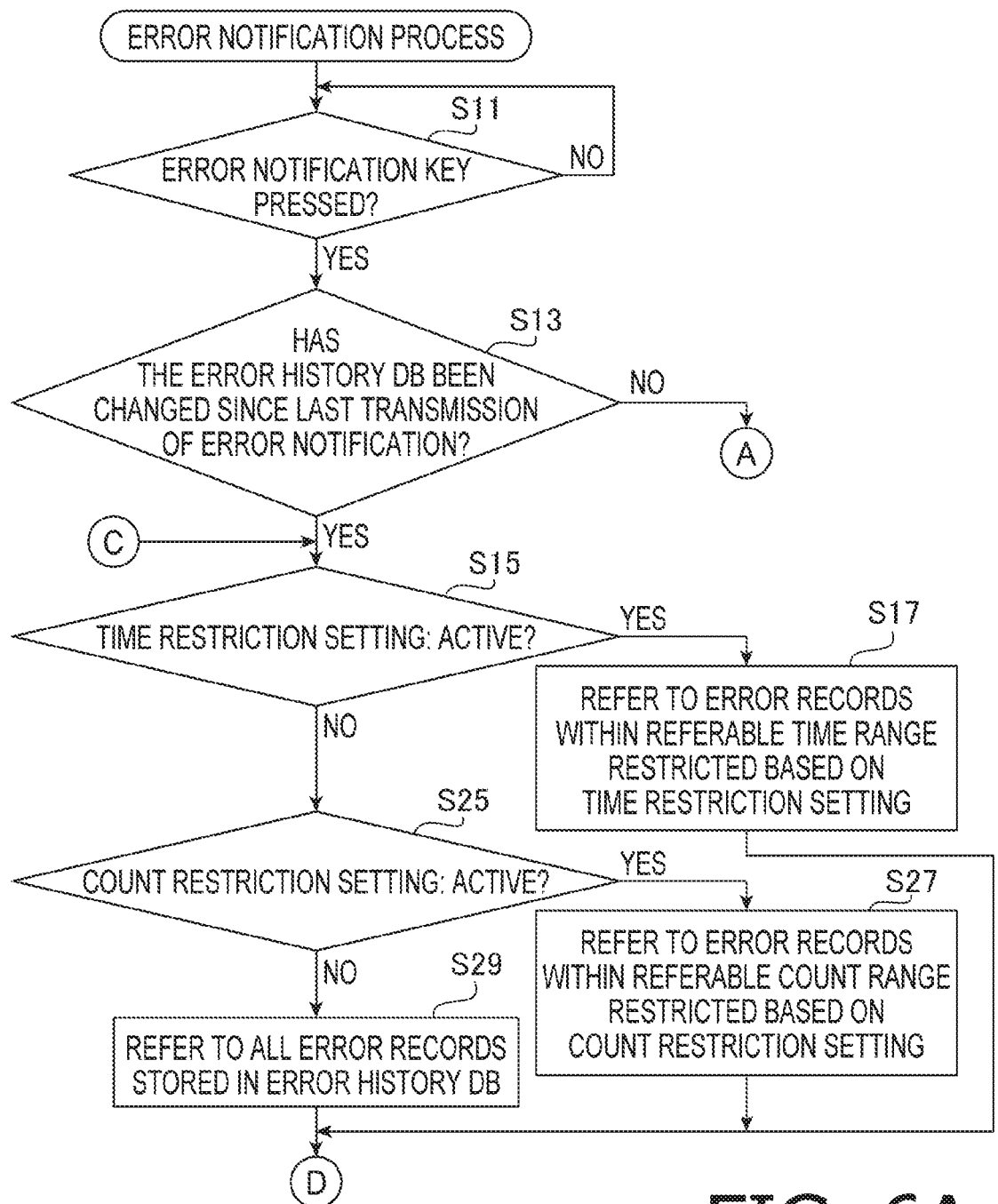
Figure 6B:
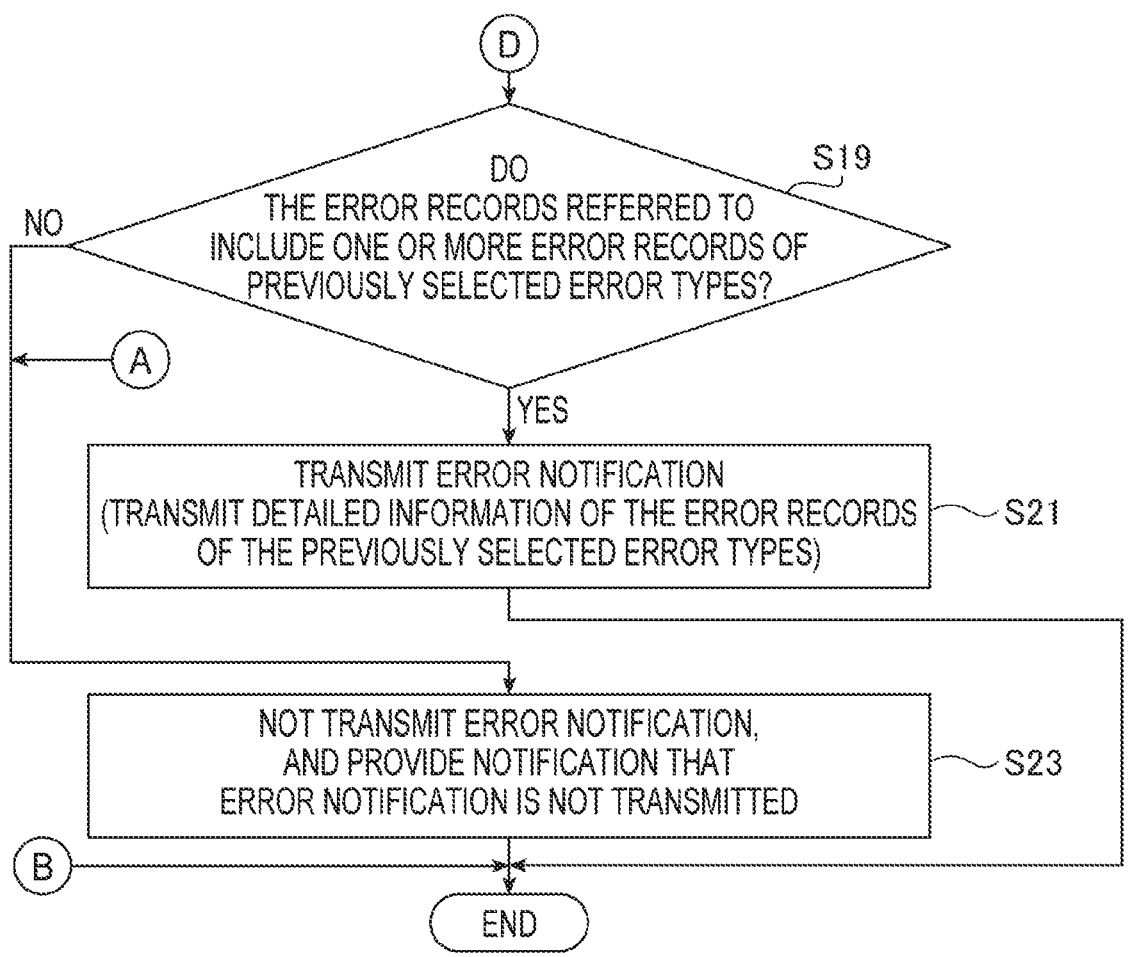

FIGS. 6A and 6B are flowcharts showing a procedure of an error notification process in the first illustrative embodiment according to one or more aspects of the present disclosure.

FIG. 7 exemplifies text data to be transmitted as an error notification, in the first illustrative embodiment according to one or more aspects of the present disclosure.

Figure 8:
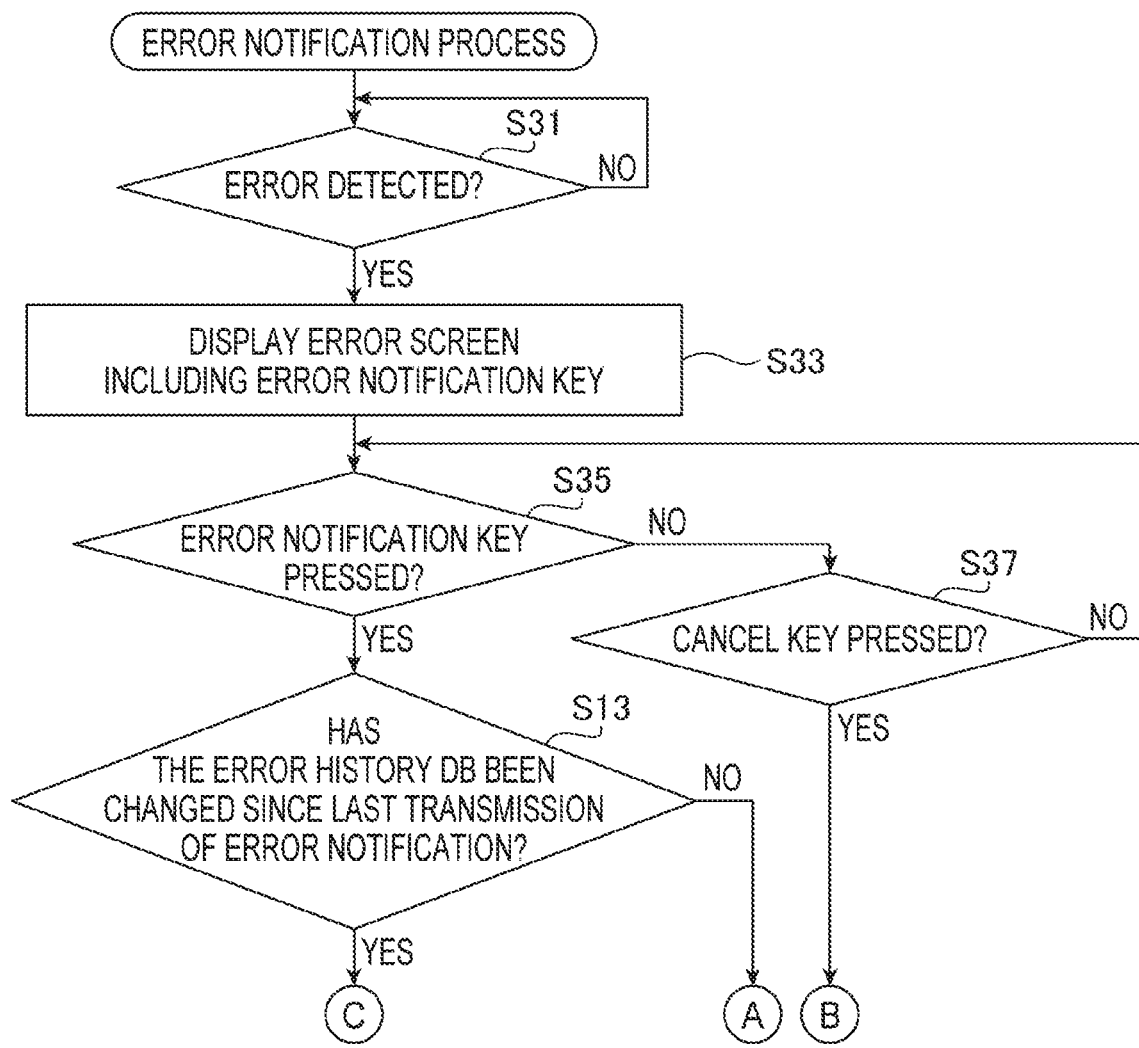

FIG. 8 is a flowchart showing a partial procedure of an error notification process in a second illustrative embodiment according to one or more aspects of the present disclosure.

FIG. 9 exemplifies an error screen displayed on the touch panel of the MFP in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Hereinafter, a first illustrative embodiment according to aspects of the present disclosure will be described with reference to relevant drawings.

(Configuration of MFP)

Figure 1:
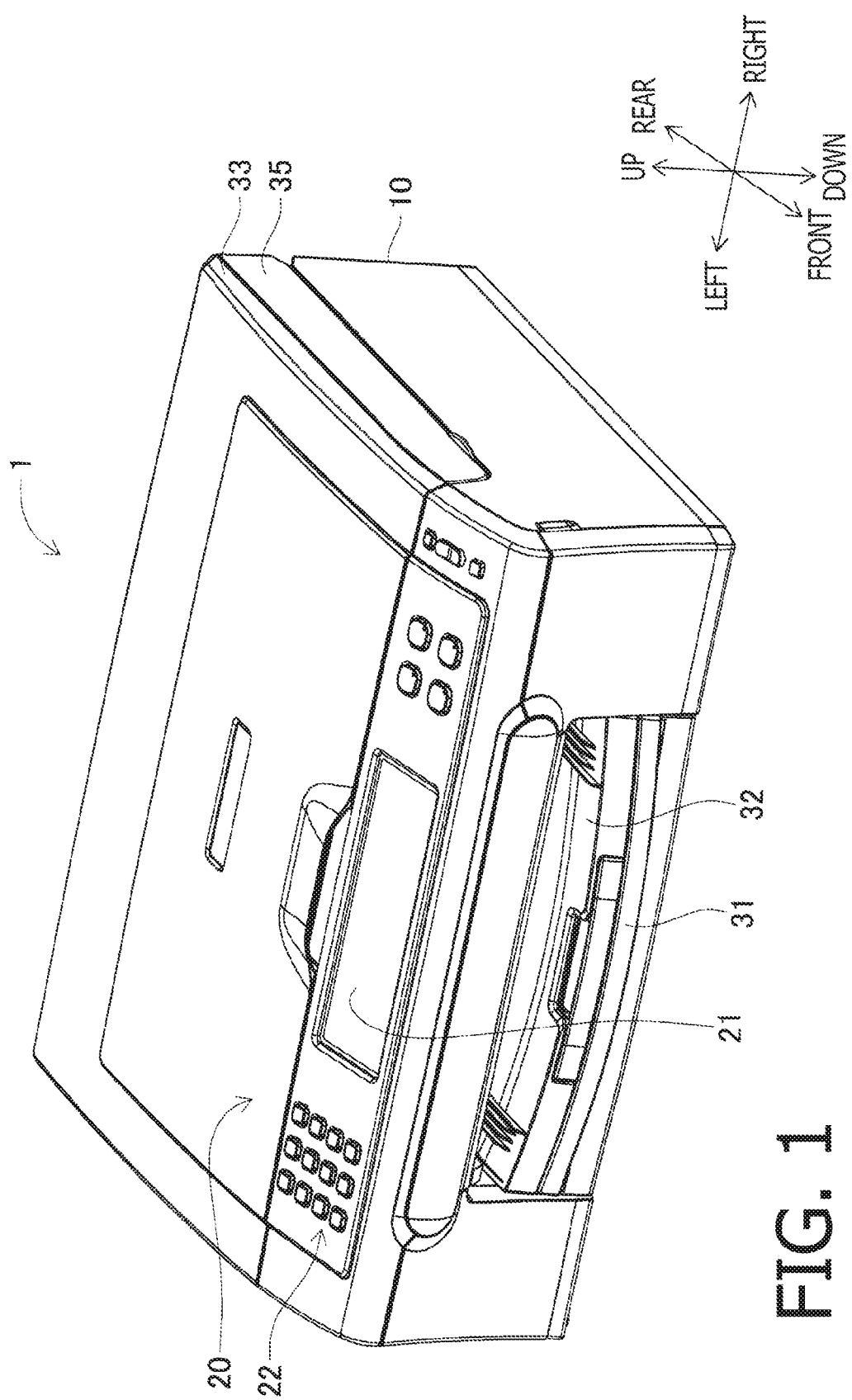
FIG. 1 is a perspective view of an MFP ("MFP" is an abbreviation of "Multi-Function Peripheral") in a first illustrative embodiment according to one or more aspects of the present disclosure.

FIG. 1 is a perspective view of a multi-function peripheral (hereinafter referred to as an "MFP") 1 of the first illustrative embodiment. The MFP 1 has a printing function, a copy function, a scanning function, and a fax function. As shown in FIG. 1, the MFP 1 includes a housing 10, a user I/F ("I/F" is an abbreviation of "interface") 20, a feed tray 31, a discharge tray 32, an upper cover 33, and a document table 35. The following description will be provided on the basis of a viewpoint of a user standing in front of the MFP 1. Specifically, a near side of FIG. 1 is defined as a front of the MFP 1. A far side of FIG. 1 is defined as a rear of the MFP 1. An upper side of FIG. 1 is defined as an upside of the MFP 1. A lower side of FIG. 1 is defined as a downside of the MFP 1. A left side of FIG. 1 is defined as a left of the MFP 1. A right side of FIG. 1 is defined as a right of the MFP 1.

The housing 10 is formed substantially in a box shape. The housing 10 contains therein a CPU 12, a memory 15, and a printer 16 (see FIG. 2). The user I/F 20 is disposed on an upper-front face of the housing 10. The user I/F 20 includes operable elements such as a touch panel 21 and a numeric keypad 22. At a lower section of the housing 10, the feed tray 31 is disposed on which one or more sheets such as pieces of paper and transparencies may be placed. The feed tray 31 is configured to be pulled out frontward and receive one or more sheets thereon. Further, the feed tray 31 is configured to be pulled out frontward and detached from the housing 10. The discharge tray 32 is disposed above the feed tray 31. The discharge tray 32 is configured to receive and support one or more sheets discharged with images formed thereon. The upper cover 33 and the document table 35 are disposed at an upper section of the housing 10. The document table 35 has a rotational shaft (not shown) disposed at a rear portion of the document table 35. Thereby, the document table 35 may swing upward around the rotational shaft, thereby opening an upper side of the housing 10. The user may exchange an ink cartridge 47 (see FIG. 2) attached inside the housing 10 for a new one via the opening at the upper side of the housing 10.

Further, the upper cover 33 is disposed to cover an upper face of the document table 35. The upper cover 33 has a rotational shaft (not shown) disposed at a rear portion of the upper cover 33. Thereby, the upper cover 33 may swing upward around the rotational shaft, thereby exposing the upper face of the document table 35. The user may swing and open the upper cover 33 and place a document sheet on the document table 35. The MFP 1 may scan the document sheet placed on the document table 35 by an image scanner 17 (see FIG. 2) disposed inside the document table 35.

Figure 2:
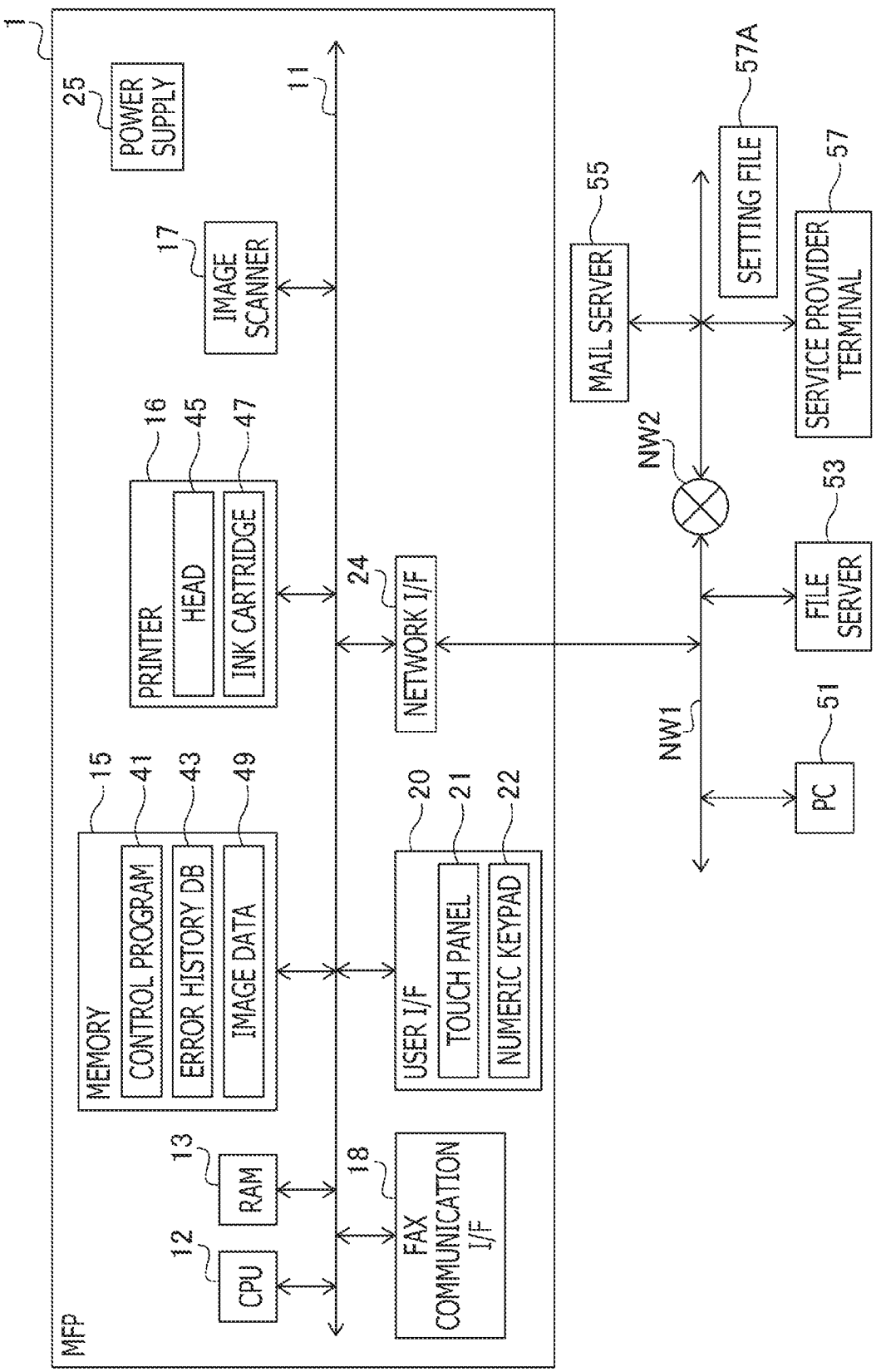
FIG. 2 is a block diagram showing an electrical configuration of the MFP in the first illustrative embodiment according to one or more aspects of the present disclosure.

Subsequently, referring to FIG. 2, an electrical configuration of the MFP 1 will be described. As shown in FIG. 2, the MFP 1 includes the CPU 12, a RAM 13, the memory 15, the printer 16, the image scanner 17, a fax communication I/F 18, the user I/F 20, and a network I/F 24. These elements included in the MFP 1 are communicably interconnected via a bus 11. Further, the MFP 1 includes a power supply 25 configured to supply electricity from a commercial power source. The power supply 25 includes a power-supply cord and power-supply circuits (e.g., a bridge diode and a smoothing circuit). The power supply 25 is configured to generate direct current electricity and supply the electricity to each element included in the MFP 1 via the power-supply cord.

The memory 15 may include a non-volatile memory such as an NVRAM. The memory 15 may be an example of a "storage" according to aspects of the present disclosure. Examples of the "storage" may include, but are not limited to, storage devices such as a RAM, a ROM, a flash memory, an HDD, a buffer for the CPU 12, and an external storage device (e.g., a USB memory) connected with the MFP 1. Further, examples of the "storage" may include a combination of at least two of the aforementioned storage devices. Moreover, examples of the "storage" may include a file server 53 connected with the MFP 1 via the network I/F 24. Further, examples of the "storage" may include non-transitory computer-readable storage media. Examples of the non-transitory computer-readable storage media may include, but are not limited to, a CD-ROM and a DVD-ROM besides the above-exemplified storage devices. The non-transitory computer-readable storage media are tangible media. Meanwhile, electric signals carrying programs downloaded from a server on the Internet may be classified as computer-readable signal media but are not included in the non-transitory computer-readable storage media.

The memory 15 stores various programs such as a control program 41. The control program 41 is for comprehensively controlling the elements included in the MFP 1. The CPU 12 may control the elements interconnected via the bus 11 while executing the control program 41 and temporarily storing processing results into the RAM 13. Further, the control program 41 contains an EWS ("EWS" is an abbreviation of "Embedded Web Server") program. The EWS program serves as a Web server. The CPU 12 may execute the EWS program, thereby causing the MFP 1 to serve as a Web server. It is noted that in the following description, the MFP 1 executing the control program 41 by the CPU 12 may be referred to merely as a name of the MFP 1. For instance, an expression "the MFP 1 receives a user operation to the touch panel 21" may denote "the MFP 1 receives a user operation to the touch panel 21 while executing the control program 41 by the CPU 12 and controlling the touch panel 21." Further, in the first illustrative embodiment, the memory 15 stores an error history DB ("DB" is an abbreviation of "database") 43. The CPU 12 monitors whether an error has occurred in the MFP 1. When detecting an error, the CPU 12 stores the detected error as an error record 44 in the error history DB 43 (see FIG. 5). The error history DB 43 will be described later in detail.

The printer 16 includes a head 45 and an ink cartridge 47. The ink cartridge 47 is configured to store ink therein. The head 45 is configured to discharge ink supplied from the ink cartridge 47, onto a sheet (e.g., a piece of paper and a transparency). Thereby, the printer 16 is configured to perform image formation on a sheet in an inkjet method under control by the CPU 12. In another instance, the printer 16 may be configured to perform image formation in another method (e.g., an electrophotographic method). When the printer 16 is an electrophotographic printer, the printer 16 may include a photoconductive drum, a development roller for supplying toner to the photoconductive drum, an exposure device for exposing the photoconductive drum, and a toner cartridge for storing toner.

The image scanner 17 includes an image sensor such as a CIS ("CIS" is an abbreviation of "Contact Image Sensor") and a CCD ("CCD" is an abbreviation of "Charge-Coupled Device") inside the document table 35. The image scanner 17 may scan a document sheet placed on the document table 35 while moving the image sensor relative to the document sheet, thereby generating image data 49. The image sensor 17 may store the generated image data into the memory 15. The fax communication I/F 18 is configured to perform fax data communication with another fax machine via a telephone line. For instance, the fax communication I/F 18 may transmit the image data 49 generated by the image scanner 17 or image data 49 of a job received from a PC 51 via the network I/F 24.

The user I/F 20 includes operable elements such as the touch panel 21 and the numeric keypad 22. For instance, the touch panel 21 may include a liquid crystal panel, a light source (e.g., an LED) for emitting light from a rear-face side of the liquid crystal panel, and a contact sensing layer overlaid on a surface of the liquid crystal panel. The user I/F 20 may display, on the touch panel 21, various setting screens and operational states of the MFP 1 under control by the CPU 12. Further, the user I/F 20 may transmit, to the CPU 12, signals responsive to user operations to the touch panel 21 and the numeric keypad 22. In the first illustrative embodiment, the MFP 1 includes the touch panel 21 serving as both a display and an operation interface. Nonetheless, the MFP 1 may include at least one hardware key as an operation interface separate from a display.

FIG. 3 exemplifies a screen 61 to be displayed on the touch panel 21. For instance, in response to the MFP 1 being turned on, the CPU 12 loads the control program 41 from the memory 15 and executes the control program 41, thereby activating a system of the MFP 1. Thereafter, the CPU 12 controls the touch panel 21 to display the screen 61 as shown in FIG. 3. For instance, the CPU 12 causes the touch panel 21 to display function keys 63 for causing the MFP 1 to perform the copy function, the scanning function, and the fax function, in a central area of the screen 61. When one of the function keys 63 is touched, the CPU 12 performs a corresponding one of the copy function, the scanning function, and the fax function. Further, the CPU 12 controls the touch panel 21 to display a setting key 65 and an error notification key 67 in an upper area of the screen 61. The setting key 65 is a software key for causing the touch panel 21 to display a setting screen for receiving various settings for the MFP 1.

The error notification key 67 is a software key for transmitting an error notification that an error has occurred in the MFP 1 to a previously-registered contact destination (e.g., an email address). Accordingly, in the first illustrative embodiment, the CPU 12 may control the touch panel 21 to display the error notification key 67 in the forefront of the screen 61 in such a manner that the error notification key 67 is always operable by the user. Nonetheless, in another instance, the error notification key 67 may not be displayed in the forefront of the screen 61 but may be displayed on a lower-layer screen, which is displayed on the touch panel 21 in response to a user operation to the setting key 65. In a further instance, the error notification key 67 may be displayed to emerge from a left side or a right side of the function keys 63 in response to a user operation of sliding one of the function keys 63.

Referring back to FIG. 2, the network I/F 24 is a LAN ("LAN" is an abbreviation of "Local Area Network") I/F. The network I/F 24 is connected with a router (not shown) and a local area network NW1 via a LAN cable (not shown). In the first illustrative embodiment, the local area network NW1 is connected with one or more PCs 51 and the file server 53. Further, the local area network NW1 is connected with a mail server 55 and a service provider terminal 57 via a wide area network NW2. For instance, the wide area network NW2 may be the Internet. It is noted that FIG. 2 merely exemplifies a configuration of the local area network NW1 and the wide area network NW2. The method for connecting the local area network NW1 and the wide area network NW2 is not limited to a wired connection but may be a wireless connection.

The user may operate one of the one or more PCs 51, thereby transmitting a print instruction or a fax transmission instruction from the operated PC 51 to the MFP 1. For instance, the CPU 12 may control the printer 16 to perform image formation based on the image data 49 of a print job received from the PC 51. Further, the MFP 1 may transmit an email to an external device (e.g., the service provider terminal 57) via the mail server 55. The service provider terminal 57 may be a terminal device of a company that provides services for the MFP 1, does maintenance of the MFP 1, and/or repairs the MFP 1. In the first illustrative embodiment, the MFP 1 is configured to transmit an email as an error notification to the service provider terminal 57 in response to receiving a user operation to the error notification key 67 via the touch panel 21. Thereby, the user is allowed to request a serviceman to do maintenance of the MFP 1 in response to occurrence of an error. Further, in the first illustrative embodiment, the MFP 1 is configured to receive, via the EWS, a transmission destination of the error notification and types of errors to be notified. For instance, a system administrator may access the EWS of the MFP 1 by operating a Web browser on a PC 51. The CPU 12 may set an email address as a transmission destination of the error notification and set types of errors to be notified, based on information received via a Web page of the EWS.

(Configuration of Setting Screen of EWS)

FIG. 4 exemplifies a setting screen 71 of the EWS. As shown in FIG. 4, the CPU 12 displays, on the setting screen 71 of the EWS, a determination button 72, a cancel button 73, a transmission destination entry field 74, an error type selecting field 75, a time restriction entry field 77, and a count restriction entry field 78. The determination button 72 displayed in a lowest area of the setting screen 71 is configured to, when selected, determine settings input via the setting screen 71. The cancel button 73 displayed in the lowest area of the setting screen 71 is configured to, when selected, cancel the settings input via the setting screen 71. Specifically, for instance, when detecting a selection of the cancel button 73, the CPU 12 maintains current settings without replacing the current settings with the settings input via the setting screen 71. Further, when detecting a selection of the determination button 72, the CPU 12 replaces the current settings with the settings input via the setting screen 71, and performs a process based on the newly-received settings in a below-mentioned error notification process (see FIGS. 6A and 6B).

The transmission destination entry field 74 has input boxes for receiving inputs of a name, a telephone number, and an email address of the transmission destination. The CPU 12 sets the transmission destination of the error notification based on information input in the transmission destination entry field 74. For instance, the user may set, as the transmission destination of the error notification, a contact destination of a vendor of the MFP 1 and/or a contact destination of a maintenance company for the MFP 1. It is noted that a plurality of transmission destinations of the error notification may be set.

In the error type selecting field 75, an error name 75A and two radio buttons 75B are displayed for each type of error detectable by the CPU 12. The two radio buttons 75B for each error type are for setting whether to transmit the error notification to a corresponding transmission destination if a corresponding error occurs in the MFP 1. Specifically, when an "ON" button of the two radio buttons 75B positioned on the right of an error name 75A is selected, the CPU 12 configures a setting such that the error notification is transmitted to a corresponding transmission destination if a corresponding error occurs in the MFP 1. Meanwhile, when an "OFF" button of the two radio buttons 75B positioned on the right of an error name 75A is selected, the CPU 12 configures a setting such that the error notification is not transmitted to a corresponding transmission destination even if a corresponding error occurs in the MFP 1. Thereby, the user is allowed to specify error types that need the error notification.

An error name 75A of "Cover Open" represents an error to be detected when the document table 35 is opened. An error name 75A of "Sheet Jam" represents an error to be detected when a sheet is stuck on a conveyance path. An error name 75A of "Ink Shortage" represents an error to be detected when an amount of ink remaining in the ink cartridge 47 of the printer 16 is equal to or less than a particular amount. For instance, the particular amount may be a reference amount for determining whether to notify a printer driver of a small amount of ink remaining in the ink cartridge 47 so as to prompt the user to prepare a new ink cartridge 47 for replacement. An error name 75A of "Cartridge Replacement" represents an error to be detected when the ink cartridge 47 needs to be replaced with a new one because of an insufficient amount of ink remaining in the ink cartridge 47. An error name 75A of "Tray Out" represents an error to be detected when the feed tray 31 is detached from the housing 10. An error name 75A of "Memory Full" represents an error to be detected when an available storage capacity of the memory 15 or the RAM 13 is insufficient, for instance, after the MFP 1 processes a large data amount of image data 49. It is noted that the error names 75A shown in the error type selecting field 75 are just examples.

As described above, in the first illustrative embodiment, the CPU 12 is configured to detect various types of errors in the MFP 1. Although a detailed explanation of a configuration for detecting various types of errors will be omitted, a concise description thereof is as follows. For instance, relevant configurations of various types of sensors may be changed depending on the type of a detected error. Further, methods for detecting errors are not limited to specific methods. For instance, the MFP 1 may include a sensor for detecting a position of a sheet on the conveyance path and a sensor for a torque applied to a conveyance roller. The CPU 12 may detect a sheet jam based on detection signals from these sensors.

In the time restriction entry field 77, radio buttons 77A and an input box 77B are displayed. The radio buttons 77A include an "ON" button and an "OFF" button to set whether to make a time restriction setting active or inactive. The input box 77B is for receiving an input of a referable period of time. Although the time restriction setting will be described in detail later, a concise explanation thereof is as follows. In the first illustrative embodiment, when the time restriction setting is active (i.e., when the "ON" button of the radio buttons 77A is selected), in response to a user operation to the error notification key 67 on the touch panel 21, the CPU 12 refers to only error records 44 within a referable time range restricted based on the time restriction setting, among all the error records 44 (see FIG. 5) stored in the error history DB 43. Namely, among all the error records 44 registered in an error occurrence order in the error history DB 43, the CPU 12 is allowed to refer to only error records 44 of errors caused within the referable time range from a later time when the error notification key 67 has been operated through an earlier time than the later time by the referable period of time set in the time restriction entry field 77. Thereby, it is possible to reduce the number of transmissions of the error notification. Hence, when the "ON" button of the radio buttons 77A is selected, the CPU 12 sets the referable period of time input in the input box 77B to restrict the referable time range. The referable period of time settable in the input box 77B may be any length of time, e.g., several minutes, several tens of minutes, several hours, several days, or several weeks.

In the count restriction entry field 78, radio buttons 78A and an input box 78B are displayed. The radio buttons 78A include an "ON" button and an "OFF" button to set whether to make a count restriction setting active or inactive. The input box 78B is for receiving an input of a referable count of error records 44. Although the count restriction setting will be described in detail later, a concise explanation thereof is as follows. When the count restriction setting is active (i.e., when the "ON" button of the radio buttons 78A is selected), the CPU 12 refers to only error records 44 within a referable count range restricted based on the count restriction setting, among all the error records 44 (see FIG. 5) stored in the error history DB 43. Namely, the CPU 12 is allowed to refer to only error records 44 within the referable count range from a latest error record 44 associated with a latest error occurrence time through an older error record 44 than the latest error record 44 substantially by the referable count of error records 44 set in the count restriction entry field 78, among all the error records 44 registered in the error occurrence order in the error history DB 43. Thereby, it is possible to reduce the number of transmissions of the error notification. Hence, when the "ON" button of the radio buttons 78A is selected, the CPU 12 sets the referable count of error records 44 input in the input box 78B to restrict the referable count range. The referable count of error records 44 settable in the input box 78B is not limited to a specific number. Nonetheless, for instance, as will be described later, in a case where a maximum number (e.g., 100 as shown in FIG. 5) of error records 44 storable in the error history DB 43 is set, when a number more than the maximum number of storable error records 44 is input in the input box 78B, the CPU 12 may not normally receive the input but may inform the user of the inappropriate input as an error.

A method for receiving the aforementioned settings for the transmission destination of the error notification, selections of types of errors to be notified, the time restriction, and the count restriction is not limited to the method using a Web server such as the EWS. For instance, the CPU 12 may receive the settings in accordance with input operations via the touch panel 21. In another instance, the CPU 12 may receive the settings from an external terminal. In a further instance, the CPU 12 may receive the settings from the service provider terminal 57 via the wide area network NW2. In this case, the CPU 12 may receive a setting file 57A (see FIG. 2) from the service provider terminal 57 via the wide area network NW2, and may update the settings based on the received setting file 57A. Thereby, even though the user of the MFP 1 or the system administrator do not update the settings via the EWS, the service provider may update the settings remotely by operating the service provider terminal 57. For instance, when there is a problem that the MFP 1 frequently performs erroneous transmission of the error notification, the maintenance company may reduce the number of erroneous transmissions by setting strict restrictions. In this case, the CPU 12 may not inform the user or the system administrator of the settings updated based on the setting file 57A, thereby improving the settings without making the user or the system administrator aware of the updated settings. It is noted that the setting items (see e.g., the transmission destination entry field 74 and the error type selecting field 75) on the setting screen 71 shown in FIG. 4 are just examples. For instance, the CPU 12 may receive, via the setting screen 71, the maximum number of error records 44 storable in the error history DB 43 and/or a data format (e.g., PDF and CSV) of the error notification.

(Updating of Error History DB)

Subsequently, updating of the error history DB 43 stored in the memory will be described. As shown in FIG. 2, the memory 15 stores the error history DB 43 in which error records of errors caused in the MFP 1 are registered. For instance, the CPU 12 executes the control program 41, thereby storing information on an error caused in the MFP 1 as an error record 44 into the error history DB 43. FIG. 5 exemplifies varying states of the error history DB 43 updated in a sequence indicated by arrows. In the following description, as shown in FIG. 5, in order to distinguish one state from another of the error history DB 43 as sequentially updated, the states of the error history DB 43 may be referred to as the error history DBs 43A, 43B, 43C, 43D, and 43E, respectively, in an order from the oldest error history DB 43A. Further, when all the states of the error history DB 43 are collectively referred to without being distinguished from each other, every state of the error history DB 43 may be simply referred to as the error history DB 43 without any alphabet attached to the reference numeral. Further, in FIG. 5, characters put above each state of the error history DB 43 represent a corresponding type of error caused in the MFP 1.

As shown in FIG. 5, for instance, the CPU 12 stores, into the error history DB 43, one or more error records 44 each of which has a record number, an error occurrence time, and an error type in association with each other. Further, when a particular condition is satisfied, the CPU 12 performs an initialization process to delete every error record 44 stored in the error history DB 43. For instance, when receiving an initialization instruction via the EWS, the CPU 12 may perform the initialization process.

In FIG. 5, the oldest error history DB 43A shows a first error (e.g., Sheet Jam) caused after the initialization process in which every error record 44 stored in the error history DB 43 has been deleted. In this example, the CPU 12 stores information on "Sheet Jam" as a first error record 44 in the error history DB 43A. Although the following features are not shown in FIG. 5 for the sake of simple drawing, the CPU 12 stores, into the error history DB 43, detailed information (see FIG. 7) regarding each individual error caused, in association with a corresponding error record 44 thereof. For instance, when "Sheet Jam" has occurred, the CPU 12 stores, into the error history DB 43, detailed information including details as to where the sheet is stuck on the conveyance path, which conveyance roller was rotating when "Sheet Jam" occurred, and whether a size of sheets set in the feed tray 31 is appropriate. Further, the detailed information may include details regarding a value of an electric current applied to each driving source when "Sheet Jam" occurred, and a temperature inside the MFP 1. The detailed information is used for a below-mentioned error notification. Likewise, when one of the other types of errors than "Sheet Jam" has occurred, the CPU 12 stores detailed information on the error into the error history DB 43. In another instance, the CPU 12 may store, into the error history DB 43, only detailed information concerning each type of error for which the "ON" button of the two radio buttons 75B is selected in the error type selecting field 75.

Subsequently, suppose for instance that another error of "Cartridge Replacement" has occurred. In this case, the CPU 12 changes the record number of the error record 44 of "Sheet Jam," which is stored as the first error record 44 in the error history DB 43A, from one to two. Further, the CPU 12 stores a new error record 44 of "Cartridge Replacement" as a first error record 44 in the error history DB 43. Thereby, the error history DB 43 is brought into a state of the error history DB 43B shown in FIG. 5. Namely, the CPU 12 stores a new error record 44 of the newly-caused error (i.e., Cartridge Replacement) in association with the smallest record number (i.e., one), while re-associating the existing error record 44 of the earlier-caused error (i.e., Sheet Jam) with a larger record number (i.e., two). Likewise, for instance, when a further error of "Cover Open" has occurred, the CPU 12 stores a new error record 44 of the newly-caused error (i.e., Cover Open) in association with the smallest record number (i.e., one), while re-associating the existing error records 44 of the earlier-caused errors (i.e., "Cartridge Replacement" and "Sheet Jam") with larger record numbers (i.e., two and three), respectively (see the error history DB 43C in FIG. 5).

In the first illustrative embodiment, for instance, the error history DB 43 may store up to 100 error records 44. Nonetheless, the maximum number of storable error records 44 may be changed via the EWS. When errors more than the maximum number (e.g., 100) of storable error records 44 have occurred, the CPU 12 deletes the oldest error record 44 from the error history DB 44. For instance, the error history DB 43D in FIG. 5 shows a state where there are 100 error records 44 stored therein after an error of "Tray Out" has occurred. In the error history DB 43D, the oldest error record 44 is the error record 44 of "Sheet Jam" as the first error caused after the initialization process.

Subsequently, when an error of "Memory Full" has occurred, the CPU 12 deletes the oldest error record 44 of "Sheet Jam" in the error history DB 43D, re-associates the other error records 44 with larger record numbers, and stores a new error record 44 of the latest error (i.e., Memory Full) in association with the smallest record number (i.e., one) (see the error history DB 43E in FIG. 5). Thus, the CPU 12 updates the error records 44 stored in the error history DB 43 each time a new error occurs. Nonetheless, the aforementioned procedure to update the error history DB 43 is just an example. In another instance, the CPU 12 may store error records 44 with respect to each type of error.

(Error Notification Process)

Next, an error notification process will be described with reference to FIGS. 6A and 6B. FIGS. 6A and 6B are flowcharts showing a procedure of the error notification process. For instance, the CPU 12 may start the error notification process (see FIGS. 6A and 6B) at a timing when the CPU 12 sets the error notification key 67 active so as to be able to receive a user operation to the error notification key 67. Specifically, for instance, the CPU 12 may start the error notification process (see FIGS. 6A and 6B) after the CPU 12 executes the control program 41 in response to the MFP 1 being powered on and completely displays an initial screen on the touch panel 21. In another instance, the CPU 12 may start the error notification process (see FIGS. 6A and 6B) when causing the touch panel 21 to display a screen in response to a user operation to an operable element (e.g., the numeric keypad 22) after once erasing the screen on the touch panel 21 in order to reduce power consumption.

It is noted that every flowchart in the present disclosure generally shows a process by the CPU 12 in accordance with instructions written in a program (e.g., the control program 41). Namely, in the following description, processes such as "determining," "referring," and "transmitting" represent processes by the CPU 12. The processes by the CPU 12 may include hardware control.

As shown in FIG. 6A, in S11, the CPU 12 first determines whether the error notification key 67 on the touch panel 21 has been pressed. The CPU 12 repeatedly makes the determination in S11 until the CPU 12 detects that the error notification key 67 has been pressed (S11: No). It is noted that the CPU 12 may terminate the error notification process shown in FIGS. 6A and 6B when setting invalid a user operation to the error notification key 67 (e.g., when erasing the display on the touch panel 21).

When determining that the error notification key 67 has been pressed (S11: Yes), the CPU 12 goes to S13. In S13, the CPU 12 determines whether the error history DB 43 has been changed since last transmission of the error notification. For instance, when having stored a new error record 44 into the error history DB 43 and updated the error history DB 43 since the last transmission of the error notification, the CPU 12 determines that the error history DB 43 has been changed (S13: Yes). In another instance, when having deleted all the error records 44 stored in the error history DB 43 in response to receipt of an initialization instruction via the EWS after the last transmission of the error notification, the CPU 12 determines that the error history DB 43 has been changed (S13: Yes). Meanwhile, when not having updated or initialized the error history DB 43 since the last transmission of the error notification, the CPU 12 determines that the error history DB 43 has not been changed (S13: No).

When determining that the error history DB 43 has been changed (S13: Yes), the CPU 12 goes to S15. Meanwhile, when determining that the error history DB 43 has not been changed (S13: No), the CPU 12 goes to S23. In S23, the CPU 12 terminates the error notification process shown in FIGS. 6A and 6B, without transmitting the error notification. Further, in S23, the CPU 12 provides a notification that the error notification is not transmitted. For instance, the CPU 12 may cause the touch panel 21 to display information representing that the error notification is not transmitted since the error history DB 43 has not been changed since the last transmission of the error notification. Thereby, it is possible to let the user who has operated the error notification key 67 know that the error notification is not transmitted and why the error notification is not transmitted.

Further, in S15, the CPU 12 determines whether the time restriction setting is active. Specifically, the CPU 12 determines whether the time restriction setting is active, based on the setting information input in the time restriction entry field 77 on the setting screen 71 (see FIG. 4). For instance, when the "ON" button of the radio buttons 77A in the time restriction entry field 77 is selected, and the determination button 72 is selected, the time restriction setting is set active. When determining that the time restriction setting is active (S15: Yes), the CPU 12 goes to S17.

In S17, among all the error records 44 registered in the order of the error occurrence time in the error history DB 43, the CPU 12 refers to only error records 44 included in the referable time range from the later time when the error notification key 67 has been operated through the earlier time than the later time by the referable period of time set in the input box 77B of the time restriction entry field 77 (see FIG. 4). Suppose for instance that the error history DB 43E in FIG. 5 shows a current state of the error history DB 43. In addition, suppose for instance that a user operation to the error notification key 67 has been detected at 12:45 on July 23. Further, suppose for instance that a setting value of "120 minutes" is set in the input box 77B of the time restriction entry field 77. In this case, among all the error records 44 stored in the error history DB 43E, the CPU 12 refers to only the two error records 44 (i.e., "Memory Full" with the record number "1" and "Tray Out" with the record number "2") within the referable time range from the later time (i.e., 12:45 on July 23) when the error notification key 67 has been operated through the earlier time (i.e., 10:45 on July 23) than the later time by the referable period of time (i.e., 120 minutes) set in the input box 77B of the time restriction entry field 77. Then, in S19 and the following steps, the CPU 12 uses only the error records 44 referred to in S17. Thus, by restricting the referable time range for selectively referring to error records 44 based on the time restriction setting, it is possible to reduce the number of transmissions of the error notification.

Subsequently, in S19, the CPU 12 determines whether the error records 44 (e.g., "Memory Full" and "Tray Out") referred to in S17 include one or more error records 44 associated with the error types previously selected in the error type selecting field 75. The CPU 12 determines, as the previously selected error types, error types for each of which the "ON" button of the radio buttons 75B is selected in the error type selecting field 75 (see FIG. 4). When determining that the error records 44 referred to in S17 include one or more error records 44 associated with the error types previously selected in the error type selecting field 75 (S19: Yes), the CPU 12 transmits the error notification (S21). Specifically, for instance, when the error records 44 referred to in S17 include "Memory Full" and "Tray Out," and the "ON" button of the radio buttons 75B is selected for at least one of "Memory Full" and "Tray Out" in the error type selecting field 75, the CPU 12 transmits the error notification (S21). It is noted that when the error records 44 referred to in S17 include all the respective error records 44 associated with the error types previously selected in the error type selecting field 75, the CPU 12 may transmit the error notification.

In S21, the CPU 12 transmits, as the error notification, the record number, the error occurrence time, and the error type of every error record 44 stored in the error history DB 43. Namely, the CPU 12 transmits, as the error notification, every piece of information except the detailed information for every error record 44 stored in the error history DB 43. Thus, in the first illustrative embodiment, the CPU 12 transmits, as the error notification, both the error records 44 associated with the error types previously selected in the error type selecting field 75 and the other error records 44 (i.e., the error records 44 associated with the other error types than the previously selected error types).

Further, with respect to specific error records 44 referred to in S17 and associated with the error types previously selected in the error type selecting field 75, the CPU 12 transmits the detailed information thereof (S21). In other words, in the first illustrative embodiment, the CPU 12 transmits the detailed information of only the specific error records 44 referred to in S17 and associated with the error types previously selected in the error type selecting field 75. For instance, the CPU 12 transmits an email with attached data (e.g., PDF data or CSV data) containing the aforementioned information such as the record numbers, the error occurrence times, the error types, and the detailed information, to the transmission destination set in the transmission destination entry field 74. Thereby, the maintenance company, which has received the email from the MFP 1, refers to the contents of the data attached to the email, thereby checking how and what types of errors have occurred in the MFP 1.

FIG. 7 exemplifies an error notification report attached to the email as the error notification. For instance, the CPU 12 may generate the error notification report in a PDF format. It is noted that the contents of the error notification report shown in FIG. 7 are just an example and may be changed depending on available functions of the MFP 1 and/or information required by the maintenance company. As shown in FIG. 7, for instance, the CPU 12 adds information such as a model number of the MFP 1 into a printer information field 81 of the error notification report. Further, the CPU 12 generates an error record field 83 for listing a plurality of error records 44, below the printer information field 81. In the error record field 83, listed are all the error records 44 stored in the error history DB 43 at a point of time when the CPU 12 executes S17 shown in FIG. 6A. Further, the CPU 12 writes, into the error notification report, the detailed information of the error records 44 of the error types selected in the error type selecting field 75. In the example shown in FIG. 7, "Memory Full" is listed as one of the error records 44 of the error types selected in the error type selecting field 75. Further, as exemplified in FIG. 7, the CPU 12 may write, as a piece of the detailed information of "Memory Full," information as to which page of which image data 49 was being generated by the MFP 1 when "Memory Full" occurred. Thereby, the receiver of the error notification may grasp more exact details of each type of error as selected in the error type selecting field 75. After transmission of the error notification in S21, the CPU 12 terminates the error notification process shown in FIGS. 6A and 6B.

Further, when determining that the error records 44 referred to in S17 do not include any error records 44 associated with the error types previously selected in the error type selecting field 75 (S19: No), the CPU 12 goes to S23. In S23, without transmitting the error notification, the CPU 12 provides a notification that the error notification is not transmitted. Specifically, for instance, the CPU 12 may cause the touch panel 21 to display a message "Although a pressing operation to the error notification key 67 has been detected, since none of the errors of the error types selected in the error type selecting field 75 has occurred, the error notification is not transmitted." Thereby, it is possible to let the user who has operated the error notification key 67 know that the error notification is not transmitted.

Meanwhile, when determining that the time restriction setting is not active (S15: No), the CPU 12 determines whether the count restriction setting is active (S25). More specifically, in substantially the same manner as in S15, the CPU 12 determines whether the count restriction setting is active, based on the setting information input in the count restriction entry field 78 (S25). When determining that the count restriction setting is active (S25: Yes), the CPU 12 goes to S27.

In S27, the CPU 12 refers to only error records 44 within the referable count range from the latest error record 44 associated with the latest error occurrence time through an older error record 44 than the latest error record 44 substantially by the referable count of error records 44 set in the count restriction entry field 78, among all the error records 44 registered in the order of the error occurrence time in the error history DB 43. In this regard, it is noted that the older error record 44 is older than the latest error record 44 exactly by a particular count of error records 44 based on the referable count, in the error history DB 43. The particular count is equal to the referable count minus one. For instance, when a value of "3" is set as the referable count of error records 44 in the input box 78B, the CPU 12 refers to only three error records 44 from the latest error record of the record number "1" for "Memory Full" through an older error record of the record number "3" for "Sheet Shortage" in the error history DB 43E (see FIG. 5). Then, in S19 and the following steps, the CPU 12 uses only the error records 44 referred to in S27. Thus, by restricting the referable count range for selectively referring to error records 44 based on the count restriction setting, it is possible to reduce the number of transmissions of the error notification.

Subsequently, in S19, in substantially the same manner as performed based on the time restriction setting, the CPU 12 determines whether the error records 44 (e.g., the record number "1" associated with "Memory Full," the record number "2" associated with "Tray Out," and the record number "3" associated with "Sheet Shortage") referred to in S27 include one or more error records 44 associated with the error types previously selected in the error type selecting field 75. When determining that the error records 44 referred to in S27 include one or more error records 44 associated with the error types previously selected in the error type selecting field 75 (S19: Yes), the CPU 12 transmits the error notification (S21). Meanwhile, when determining that the error records 44 referred to in S27 do not include any error records 44 associated with the error types previously selected in the error type selecting field 75 (S19: No), the CPU 12 does not transmit the error notification (S23).

In S21, with respect to specific error records 44 referred to in S27 and associated with the error types previously selected in the error type selecting field 75, the CPU 12 transmits the detailed information thereof. Further, in S21, with respect to the other error records 44 than the specific error records 44 among all the error records 44 stored in the error history DB 43, the CPU 12 transmits every piece of information but the detailed information for each of the other error records 44. Further, in S23, the CPU 12 causes the touch panel 21 to display the information representing that the error notification is not transmitted. Since details about the processes in S21 and S23 are substantially the same as set forth about the time restriction setting, explanations thereof will be omitted.

Meanwhile, when determining that the count restriction setting is not active (S25: No), the CPU 12 refers to all the error records 44 stored in the error history DB 43. Namely, in the first illustrative embodiment, when both the time restriction setting and the count restriction setting are inactive, the CPU 12 refers to all the error records 44 stored in the error history DB 43. Subsequently, in S19, the CPU 12 determines whether the error records 44 (i.e., all the error records 44 stored in the error history DB 43) referred to in S29 include one or more error records 44 associated with the error types previously selected in the error type selecting field 75. When determining that the error records 44 referred to in S29 include one or more error records 44 associated with the error types previously selected in the error type selecting field 75 (S19: Yes), the CPU 12 transmits the error notification (S21). Meanwhile, when determining that the error records 44 referred to in S29 do not include any error records 44 associated with the error types previously selected in the error type selecting field 75 (S19: No), the CPU 12 does not transmit the error notification (S23). Thus, it is possible to reduce the number of transmissions of the error notification, by restricting the referable ranges (e.g., the referable time range and the referable count range) for selectively referring to error records 44 in the error history DB 43 and/or by restricting error types with which the detailed information of the error records as associated is to be transmitted as the error notification.

(Advantageous Effects of First Illustrative Embodiment)

As described above, the first illustrative embodiment provides the following advantageous effects. The MFP 1 includes the printer 16, the image scanner 17, the fax communication I/F 18, the error notification key 67, the network I/F 24, and the CPU 12. The error notification key 67 is configured to, when operated, receive an instruction to transmit the error notification. In response to receiving a user operation to the error notification key 67 (S11: Yes), the CPU 12 refers to error records 44 registered in the error history DB 43 stored in the memory 15 (S17, S27, and S29), determines whether the error records 44 as referred to include one or more error records 44 associated with previously selected error types (S19), and in response to determining that the error records 44 as referred to include one or more error records 44 associated with the previously selected error types (S19: Yes), transmits the error notification via the network I/F 24 (S21).

Thereby, when the error notification key is operated, in response to determining that the error records 44 as referred to include one or more error records 44 associated with the previously selected error types, the CPU 12 transmits the error notification to an external device. In other words, even though the error notification key 67 is operated, when the error records 44 as referred to do not include any error records 44 associated with the previously selected error types, the CPU 12 does not transmit the error notification. Thus, it is possible to make the number of transmissions of the error notification less than the number of times that the error notification key 67 is operated, based on the previously selected error types. For instance, by previously selecting such error types as surely need maintenance by the serviceman, it is possible to appropriately reduce the number of transmissions of the error notification.

Further, the CPU 12 may receive, via the setting screen 71 (see FIG. 4) of the EWS, reference conditions for restricting referable ranges (e.g., the referable time range and the referable count range) for specifying error records 44 to be referred to. Then, in S17 or S27, the CPU 12 refers to only error records 44 within a relevant referable range restricted based on a corresponding reference condition, among all the error records 44 stored in the error history DB 43. Thereby, without referring to all the error records 44 stored in the error history DB 43, the CPU 12 refers to only the error records 44 within the relevant referable range restricted based on the corresponding reference condition (e.g., the time restriction setting and the count restriction setting). Then, in S19, the CPU 12 uses only the error records 44 as referred to in S17 or S27. Thus, by restricting the relevant referable range, it is possible to further reduce the number of times that the error notification is transmitted.

Specifically, for instance, the CPU 12 may receive, as a reference condition, the referable count of error records 44 (see the count restriction entry field 78 in FIG. 4). Then, in S27, the CPU 12 refers to error records 44 within the referable count range from a latest error record 44 associated with a latest error occurrence time through an older error record 44 than the latest error record 44 by a particular count of error records 44 based on the referable count, among all the error records 44 registered in the order of the error occurrence time in the error history DB 43. Thus, the CPU 12 refers to only error records 44 within the referable count range restricted based on the reference condition (e.g., the count restriction setting). Accordingly, the CPU 12 restricts the referable count range, thereby referring to only latest error records of the referable count. Thereby, it is possible to reduce the number of transmissions of the error notification, without referring to older error records.

Further, the CPU 12 may receive, as a reference condition, the referable period of time (see the time restriction entry field 77 in FIG. 4). Then, in S17, the CPU 12 refers to error records 44 included in the referable time range from a later time when a user operation to the error notification key 67 has been detected through an earlier time than the later time by the referable period of time, among all the error records 44 registered in the order of the error occurrence time in the error history DB 43. Thus, the CPU 12 refers to only error records 44 within the referable time range restricted based on the reference condition (e.g., the time restriction setting). Accordingly, the CPU 12 restricts the referable time range, thereby referring to only immediate error records within the referable period of time after the error notification key 67 has been operated. Thereby, it is possible to reduce the number of transmissions of the error notification, without referring to older error records.

Further, the CPU 12 transmits, as the error notification, both the error records 44 associated with the previously selected error types and the other error records 44 (i.e., the error records 44 associated with the other error types than the previously selected error types) (S21). Accordingly, the CPU 12 transmits not only the error records 44 of the previously selected error types but also the other error records 44, as the error notification. Thus, by referring to the information contained in the other error records 44, the service provider who has received the error notification may understand how and why the errors of the previously selected error types have occurred.

Further, in S21, the CPU 12 transmits the error notification that contains more detailed information (see the detailed information in FIG. 7) of the error records 44 of the previously selected error types than information of the other error records. Thereby, the service provider who has received the error notification may more appropriately understand how and why the errors of the previously selected error types have occurred.

Further, in response to determining in S19 that the error records 44 referred to in S17 do not include the error records 44 of the previously selected error types (S19: No), the CPU 12 does not transmit the error notification (S23). Thus, since the CPU 12 does not transmit the error notification when making a negative determination in S19, it is possible to reduce the number of transmissions of the error notification.

Further, in response to determining in S19 that the error records 44 referred to in S17 do not include the error records 44 of the previously selected error types (S19: No), the CPU 12 provides a notification that the error notification is not transmitted (S23). Thus, since the CPU 12 provides the notification that the error notification is not transmitted when making a negative determination in S19, it is possible to let the user know that the error notification is not transmitted.

Further, the CPU 12 determines whether the error history DB 43 has been changed since the last transmission of the error notification (S13). In response to determining that the error history DB 43 has not been changed (S13: No), the CPU 12 does not perform any of the steps S17, S27, S29, S19, and S21. For instance, when the error history DB 43 has been changed since the last transmission of the error notification, if the CPU 12 performs one of the steps S17, S27, and S29 in the same manner as performed for the last transmission of the error notification, the CPU 12 is highly likely to transmit an error notification having the same information as contained in the last-transmitted error notification. Hence, in the first illustrative embodiment, when the error history DB 43 has not been changed since the last transmission of the error notification, the CPU 12 does not perform any of the steps S17, S27, S29, S19, and S21. Thereby, it is possible to reduce the number of transmissions of an unnecessary error notification.

Second Illustrative Embodiment

Next, a second illustrative embodiment according to aspects of the present disclosure will be described. In the aforementioned first illustrative embodiment, the error notification key 67 is displayed on the screen 61 (see FIG. 3) on which the function keys 63 and the setting key 65 are displayed as well. Nonetheless, the screen for displaying thereon the error notification key 67 is not limited to the screen 61. For instance, the CPU 12 may control the touch panel 21 to display the error notification key 67 on an error screen displayed in response to detection of an error caused in the MFP 1. It is noted that, in the following description, substantially the same elements and processes as exemplified in the aforementioned first illustrative embodiment will be provided with the same reference characters, and explanations thereof may be omitted.

FIG. 8 is a flowchart showing a part of an error notification process in the second illustrative embodiment. The other part of the error notification process will be described with reference to FIGS. 6A and 6B. For instance, the CPU 12 may start the process shown in FIG. 8 after activating the system of the MFP 1 by executing the control program 41 in response to the MFP 1 being powered on. First, in S31, the CPU 12 determines whether an error to be stored as an error record 44 has occurred. The CPU 12 repeatedly performs S31 until an error to be stored as an error record 44 occurs (S31: No). Thereby, the CPU 12 always monitors occurrence of an error in the MFP 1.

Subsequently, when determining that an error has occurred (S31: Yes), the CPU 12 controls the touch panel 21 to display an error screen 91 (S33). FIG. 9 exemplifies the error screen 91 displayed in response to occurrence of "Sheet Jam." For instance, as shown in FIG. 9, the CPU 12 causes the touch panel 21 to display a title field 92 substantially in the middle of an upper area of the error screen 91. In the title field 92, the type of the error caused in the MFP 1 is shown. Further, the CPU 12 causes the touch panel 21 to display an error information field 93 substantially in a central area of the error screen 91. In the error information field 93, for instance, an error code of the error caused in the MFP 1 is shown. Thus, the user is allowed to know the type of the error caused in the MFP 1 by checking the information displayed on the touch panel 21. In another instance, the CPU 12 may cause the touch panel 21 to display detailed information on the error caused in the MFP 1 in the error information field 93. More specifically, the CPU 12 may cause the touch panel 21 to show, in the error information field 93, a figure depicting the conveyance path of the MFP 1 and a position of a sheet stuck on the conveyance path.

Further, the CPU 12 causes the touch panel 21 to display a cancel key 94 and an error notification key 95 in a lower area of the error screen 91. After S33, the CPU 12 determines whether the error notification key 95 displayed on the error screen 91 has been pressed (S35). When determining that the error notification key 95 has not been pressed (S35: No), the CPU 12 determines whether the cancel key 94 has been pressed (S37). When determining that the cancel key 94 has been pressed (S37: Yes), the CPU 12 terminates the error notification process (see the connector B in FIGS. 6 and 8). Thus, the user is allowed to interrupt transmission of the error notification by pressing the cancel key 94.

Meanwhile, when determining that the cancel key 94 has not been pressed (S37: No), the CPU 12 again makes the determination in S35. For instance, while none of the keys 94 and 95 is pressed, the CPU 12 maintains the error screen 91 displayed on the touch panel 21. After a lapse of a particular period of time with the error screen 91 being displayed on the touch panel 21, the CPU 12 halts displaying the error screen 91 and terminates the error notification process shown in FIG. 8. In this case, the CPU 12 may not transmit the error notification.

Further, when determining that the error notification key 95 has been pressed (S35: Yes), the CPU 12 determines whether the error history DB 43 has been changed since the last transmission of the error notification (S13). Then, depending on the determination in S13, the CPU 12 goes to S15 (see the connector C in FIGS. 6 and 8) or S23 (see the connector A in FIGS. 6 and 8). Further, for instance, when transmitting the error notification in S21 (see FIG. 6B), the CPU 12 may transmit image data representing the error screen 91. Specifically, the CPU 12 may transmit, as the error notification, an email with attached image data generated by capturing the error screen 91. Thereby, a receiver of the error notification may see the captured image data, thereby easily and definitely grasping what type of error has been detected in the error notification process.

It is noted that, in the aforementioned first illustrative embodiment, the CPU 12 may transmit the image data of the error screen 91. Specifically, for instance, the CPU 12 may transmit the image data of the error screen 91 for the latest error (associated with the record number "1" in the error history DB 43) among the errors caused before pressing of the error notification key 67.

(Advantageous Effects of Second Illustrative Embodiment)

As described above, the second illustrative embodiment provides substantially the same effects as the aforementioned first illustrative embodiment and the following advantageous effects. The MFP 1 includes the touch panel 21. The error notification key 95 is a software key displayed on the touch panel 21. The CPU 12 determines whether an error to be stored as an error record 44 has occurred (S31 in FIG. 8). When determining that an error to be stored as an error record 44 has occurred (S31: Yes), the CPU 12 controls the touch panel 21 to display the error screen 91, which includes the title field 92, the error information field 93, and the error notification key 95 displayed thereon (S33).

Hence, the user may determine whether to transmit the error notification, while referring to error information (e.g., the title field 92 and the error information field 93) displayed on the error screen 91 and confirming what type of error has occurred. Thus, it is possible to reduce the number of transmissions of an unnecessary error notification.

Further, the CPU 12 determines whether the error notification key 95 displayed on the error screen 91 has been pressed (S35). In response to determining that the error notification key 95 displayed on the error screen 91 has been pressed (S35: Yes), the CPU 12 may transmit the image data representing the error screen 91 displayed on the touch panel 21 (S21 in FIG. 6B). For instance, the image data may be generated by capturing the error screen 91 with the error information (e.g., the title field 92 and the error information field 93) displayed thereon. Thus, when the CPU 12 transmits the image data generated by capturing the error screen 91 containing the error information, a receiver of the image data may see the received image data and easily grasp the error information regarding the error to be notified by the error notification.

(Modifications)

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

The error notification key 67 may not necessarily be a software key but may be a hardware key such as the numeric keypad 22. In the aforementioned illustrative embodiments, the error history DB 43 is stored in the memory 15 of the MFP 1. Nonetheless, the error history DB 43 may be stored in the file server 53. In this case, the MFP 1 may refer to the error history DB 43 stored in the file server 53. In the aforementioned illustrative embodiments, the error notification is transmitted via email. Nonetheless, the CPU 12 may make a call to the telephone number (see FIG. 4) set via the EWS and transmit the error notification report (see FIG. 7) as the error notification via facsimile.

In the aforementioned illustrative embodiments, the MFP 1 is configured to refer to error records 44 within the referable time range restricted based on the time restriction setting as a reference condition (S17) and refer to error records 44 within the referable count range restricted based on the count restriction setting as a reference condition (S27). Nonetheless, the MFP 1 may be configured to execute none of S17 and S27. For instance, the CPU 12 may not perform S15 or S25. In this case, when determining that the error history DB 43 has been changed (S13: Yes), the CPU 12 may go to S29. Namely, the CPU 12 may refer to all the error records 44 stored in the error history DB 43 in S29 without making a determination about any reference conditions in S15 or S25, and thereafter may perform S19. Further, the MFP 1 may be configured to perform only one of S17 and S27.

In the aforementioned illustrative embodiments, the CPU 12 determines whether the time restriction setting is active (S15), and determines whether the count restriction setting is active (S25) in response to determining that the time restriction setting is not active (S15: No). Nonetheless, the CPU 12 may determine whether the count restriction setting is active, in advance of determining whether the time restriction setting is active. Namely, the CPU 12 may determine whether the time restriction setting is active, in response to determining that the count restriction setting is not active.

In the aforementioned illustrative embodiments, in S17, the CPU 12 refers to only error records 44 within the referable time range from the later time when a user operation to the error notification key 67 has been detected through the earlier time than the later time by the referable period of time set in the input box 77B, among all the error records 44 registered in the order of the error occurrence time in the error history DB 43. Nonetheless, the CPU 12 may refer to only error records 44 within a referable time range from a later time when the latest error record 44 has been stored into the error history DB 43 through an earlier time than the later time by the referable period of time set in the input box 77B.

In the aforementioned illustrative embodiments, in S21, the CPU 12 transmits, as the error notification, both the error records 44 associated with the error types previously selected in the error type selecting field 75 and the other error records 44 (i.e., the error records 44 associated with the other error types than the previously selected error types). Nonetheless, the CPU 12 may transmit only the error records 44 of the previously selected error types. Further, in the aforementioned illustrative embodiments, in S21, the CPU 12 transmits the detailed information of the error records 44 of the previously selected error types. Nonetheless, the CPU 12 may not transmit the detailed information of the error records 44 of the previously selected error types.

Further, in the aforementioned illustrative embodiments, in S19 (see FIG. 6B), when determining that the error records 44 referred to in S17 do not include any error records 44 of the error types previously selected in the error type selecting field 75 (S19: No), the CPU 12 automatically cancels transmission of the error notification (S23). Nonetheless, when making the negative determination in S19 (S19: No), the CPU 12 may perform another process. For instance, the CPU 12 may confirm that it is acceptable to the user who has operated the error notification key 67 to cancel transmission of the error notification. More specifically, the CPU 12 may control the touch panel 21 to display a button for receiving an instruction to transmit the error notification, another button for cancelling transmission of the error notification, and a message such as "The error notification will not be transmitted since the error records 44 as referred to do not include any error records 44 of the error types previously selected in the error type selecting field 75. Is that acceptable?" Thus, the user is allowed to, after confirming the message displayed on the touch panel 21, make a final determination as to whether to transmit the error notification. Further, in S23, the CPU 12 may not provide a notification that the error notification is not transmitted.

Further, the CPU 12 may be configured to perform both the error notification process (see FIGS. 6A and 6B) based on a user operation to the error notification key 67 (S11: Yes) in the aforementioned first illustrative embodiment and the error notification process (see FIG. 8) based one detection of an error caused in the MFP 1 (S31: Yes) in the aforementioned second illustrative embodiment.

In the aforementioned illustrative embodiments, in S13, the CPU 12 determines whether the error history DB 43 has been changed since the last transmission of the error notification. Nonetheless, the CPU 12 may not determine whether the error history DB 43 has been changed since the last transmission of the error notification. For instance, the CPU 12 may again perform the error notification process, regardless of whether the error history DB 43 has been changed since the last transmission of the error notification.

In the aforementioned illustrative embodiments, the error history DB 43 is employed as "error history data" according to aspects of the present disclosure. Nonetheless, a data format of the "error history data" is not limited to a format of a database in which a plurality of pieces of information included in each single error record are associated with each other. For instance, the data format of the "error history data" may be a format of text data (e.g., a CSV file) that is a delimited text file using a particular character (e.g., a comma) to separate values.

In the aforementioned illustrative embodiments, the CPU 12 executing particular programs (e.g., the control program 41) is employed as a "controller" according to aspects of the present disclosure. Nonetheless, for instance, one or more specific hardware elements such as one or more ASICs ("ASIC" is an abbreviation of "Application Specific Integrated Circuit") may be employed as the "controller" according to aspects of the present disclosure. Further, the "controller" according to aspects of the present disclosure may be achieved by performing software processing and hardware processing. Further, in the aforementioned illustrative embodiments, the MFP 1 is employed as an "information processing apparatus" according to aspects of the present disclosure. Nonetheless, a printer having only a printing function may be employed as the "information processing apparatus" according to aspects of the present disclosure.

Associations between elements exemplified in the aforementioned illustrative embodiments and elements according to aspects of the present disclosure will be exemplified below. The MFP 1 may be an example of an "information processing apparatus" according to aspects of the present disclosure. The user I/F 20 may be an example of a "user interface" according to aspects of the present disclosure. Further, the error notification key 67 displayed on the touch panel 21 may be an example of a "software key" displayed on a "display" according to aspects of the present disclosure. The network I/F 24 may be an example of a "communication interface" according to aspects of the present disclosure. The CPU 12 executing the control program 41 stored in the memory 15 may be an example of a "controller" according to aspects of the present disclosure. In other words, the CPU 12 and the memory 15 storing the control program 41 may be included in the "controller" according to aspects of the present disclosure. Nonetheless, as described above, one or more specific hardware elements such as one or more ASICs may be employed as the "controller" according to aspects of the present disclosure. Further, the "controller" according to aspects of the present disclosure may be achieved by performing software processing and hardware processing. The error history DB 43 may be an example of "error history data" according to aspects of the present disclosure. As described above, the error history DB 43 may be stored in the memory 15 or the file server 53. Namely, the memory 15 and the file server 53 may be included in examples of a "memory" storing the "error history data" according to aspects of the present disclosure. The memory 15 storing the control program 41 may be an example of a "non-transitory computer-readable medium" storing "computer-readable instructions" according to aspects of the present disclosure.

What is claimed is:

1. An information processing apparatus comprising:
a user interface;
a communication interface; and
a controller configured to:
in response to receiving via the user interface an instruction to transmit an error notification, refer to one or more error records registered in error history data stored in a memory, each error record representing an error caused in the information processing apparatus;
determine whether the one or more error records referred to include at least one error record associated with a previously selected error type; and
in response to determining that the one or more error records referred to include the at least one error record associated with the previously selected error type, transmit the error notification to an external device via the communication interface.

2. The information processing apparatus according to claim 1,
wherein the controller is further configured to:
receive a reference condition for restricting a referable range, the referable range being for specifying the one or more error records to be referred to among all error records registered in the error history data; and
refer to only the one or more error records within the referable range restricted based on the reference condition, among all the error records registered in the error history data.

3. The information processing apparatus according to claim 2,
wherein each error record is associated with an error occurrence time and registered in an order of the error occurrence time in the error history data, and
wherein the controller is further configured to:
receive, as the reference condition, a referable count of the one or more error records to be referred to among all the error records registered in the error history data; and
refer to only the one or more error records within the referable range from a latest error record associated with a latest error occurrence time through an older error record than the latest error record by a particular count of error records based on the referable count, among all the error records registered in the order of the error occurrence time in the error history data.

4. The information processing apparatus according to claim 2,
wherein each error record is associated with an error occurrence time and registered in an order of the error occurrence time in the error history data, and wherein the controller is further configured to:
receive, as the reference condition, a referable period of time for covering error occurrence times of the one or more error records to be referred to among all the error records registered in the error history data; and
refer to only the one or more error records within the referable range from a later time when the instruction to transmit the error notification is received via the user interface through an earlier time than the later time by the referable period of time, among all the error records registered in the order of the error occurrence time in the error history data.

5. The information processing apparatus according to claim 1,
wherein the controller is further configured to transmit, via the communication interface, the error notification containing both the at least one error record associated with the previously selected error type and the other error records registered in the error history data.

6. The information processing apparatus according to claim 5,
wherein the controller is further configured to transmit, via the communication interface, the error notification containing more detailed information regarding the at least one error record associated with the previously selected error type than information regarding the other error records registered in the error history data.

7. The information processing apparatus according to claim 1,
wherein the controller is further configured to, in response to determining that the one or more error records referred to do not include the at least one error record associated with the previously selected error type, not transmit the error notification via the communication interface.

8. The information processing apparatus according to claim 1,
wherein the controller is further configured to, in response to determining that the one or more error records referred to do not include the at least one error record associated with the previously selected error type, provide a notification that the one or more error records referred to do not include the at least one error record associated with the previously selected error type.

9. The information processing apparatus according to claim 1, further comprising a display,
wherein the user interface comprises a software key displayed on the display, and
wherein the controller is further configured to:
determine whether an error to be stored as an error record has occurred; and
in response to determining that an error to be stored as an error record has occurred, control the display to display an error screen, the error screen including the software key and error information regarding the error.

10. The information processing apparatus according to claim 9,
wherein the controller is further configured to:
determine whether the software key displayed on the display has been operated; and
in response to determining that the software key displayed on the display has been operated, transmit the error notification containing image data representing the error screen.

11. The information processing apparatus according to claim 1,
wherein the controller is further configured to:
determine whether the error history data has been changed since last transmission of the error notification; and
in response to determining that the error history data has been changed since last transmission of the error notification, not perform any of:
in response to receiving via the user interface the instruction to transmit the error notification, referring to the one or more error records registered in the error history data stored in a memory;
determining whether the one or more error records referred to include the at least one error record associated with the previously selected error type; and
in response to determining that the one or more error records referred to include the at least one error record associated with the previously selected error type, transmitting the error notification to the external device via the communication interface.

12. The information processing apparatus according to claim 1,
wherein the controller comprises:
a processor; and
a non-transitory computer-readable medium storing computer-readable instructions configured to, when executed by the processor, cause the controller to:
in response to receiving via the user interface the instruction to transmit the error notification, refer to the one or more error records registered in the error history data stored in the memory;
determine whether the one or more error records referred to include the at least one error record associated with the previously selected error type; and
in response to determining that the one or more error records referred to include the at least one error record associated with the previously selected error type, transmit the error notification to the external device via the communication interface.

13. A method implementable on a processor coupled with an information processing apparatus comprising a user interface and a communication interface, the method comprising:
in response to receiving via the user interface an instruction to transmit an error notification, referring to one or more error records registered in error history data stored in a memory, each error record representing an error caused in the information processing apparatus;
determining whether the one or more error records referred to include at least one error record associated with a previously selected error type; and
in response to determining that the one or more error records referred to include the at least one error record associated with the previously selected error type, transmitting the error notification to an external device via the communication interface.

14. The method according to claim 13, further comprising:
receiving a reference condition for restricting a referable range, the referable range being for specifying the one or more error records to be referred to among all error records registered in the error history data; and referring to only the one or more error records within the referable range restricted based on the reference condition, among all the error records registered in the error history data.

15. The method according to claim 14,
wherein each error record is associated with an error occurrence time and registered in an order of the error occurrence time in the error history data, and
wherein the method further comprises:
receiving, as the reference condition, a referable count of the one or more error records to be referred to among all the error records registered in the error history data; and
referring to only the one or more error records within the referable range from a latest error record associated with a latest error occurrence time through an older error record than the latest error record by a particular count of error records based on the referable count, among all the error records registered in the order of the error occurrence time in the error history data.

16. The method according to claim 14,
wherein each error record is associated with an error occurrence time and registered in an order of the error occurrence time in the error history data, and
wherein the method further comprises:
receiving, as the reference condition, a referable period of time for covering error occurrence times of the one or more error records to be referred to among all the error records registered in the error history data; and
referring to only the one or more error records within the referable range from a later time when the instruction to transmit the error notification is received via the user interface through an earlier time than the later time by the referable period of time, among all the error records registered in the order of the error occurrence time in the error history data.

17. A non-transitory computer-readable medium storing computer-readable instructions that are executable by a processor coupled with an information processing apparatus comprising a user interface and a communication interface, the instructions being configured to, when executed by the processor, cause the information processing apparatus to:
in response to receiving via the user interface an instruction to transmit an error notification, refer to one or more error records registered in error history data stored in a memory, each error record representing an error caused in the information processing apparatus;
determine whether the one or more error records referred to include at least one error record associated with a previously selected error type; and
in response to determining that the one or more error records referred to include the at least one error record associated with the previously selected error type,
transmit the error notification to an external device via the communication interface.

18. The non-transitory computer-readable medium according to claim 17,
wherein the instructions are further configured to, when executed by the processor, cause the information processing apparatus to:
receive a reference condition for restricting a referable range, the referable range being for specifying the one or more error records to be referred to among all error records registered in the error history data; and
refer to only the one or more error records within the referable range restricted based on the reference condition, among all the error records registered in the error history data.

19. The non-transitory computer-readable medium according to claim 18,
wherein each error record is associated with an error occurrence time and registered in an order of the error occurrence time in the error history data, and
wherein the instructions are further configured to, when executed by the processor, cause the information processing apparatus to:
receive, as the reference condition, a referable count of the one or more error records to be referred to among all the error records registered in the error history data; and
refer to only the one or more error records within the referable range from a latest error record associated with a latest error occurrence time through an older error record than the latest error record by a particular count of error records based on the referable count, among all the error records registered in the order of the error occurrence time in the error history data.

20. The non-transitory computer-readable medium according to claim 18,
wherein each error record is associated with an error occurrence time and registered in an order of the error occurrence time in the error history data, and
wherein the instructions are further configured to, when executed by the processor, cause the information processing apparatus to:
receive, as the reference condition, a referable period of time for covering error occurrence times of the one or more error records to be referred to among all the error records registered in the error history data; and
refer to only the one or more error records within the referable range from a later time when the instruction to transmit the error notification is received via the user interface through an earlier time than the later time by the referable period of time, among all the error records registered in the order of the error occurrence time in the error history data.

* * * * *